United States Patent
Onishi et al.

(10) Patent No.: US 6,637,410 B2
(45) Date of Patent: Oct. 28, 2003

(54) HIGH PRESSURE FUEL SUPPLY APPARATUS

(75) Inventors: Yoshihiko Onishi, Tokyo (JP); Kouichi Ojima, Tokyo (JP); Yuta Ichinose, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/114,032

(22) Filed: Apr. 3, 2002

(65) Prior Publication Data

US 2003/0056768 A1 Mar. 27, 2003

(30) Foreign Application Priority Data

Sep. 27, 2001 (JP) ........................................ 2001-295850

(51) Int. Cl.[7] ................................................ F02M 37/04
(52) U.S. Cl. .................... 123/467; 123/506; 137/538; 137/543.21
(58) Field of Search ................. 123/506, 467, 123/458, 456, 495; 137/543.19, 538, 543.21; 417/296, 501

(56) References Cited

U.S. PATENT DOCUMENTS

| | | | | |
|---|---|---|---|---|
| 2,421,475 A | * | 6/1947 | Beeh ........................... | 123/506 |
| 3,245,429 A | * | 4/1966 | Bacino et al. ......... | 137/543.21 |
| 3,626,977 A | * | 12/1971 | Riley et al. ............ | 137/516.25 |
| 4,074,668 A | * | 2/1978 | Indra ........................... | 417/242 |
| 4,284,101 A | * | 8/1981 | Weirich ..................... | 137/538 |
| 4,313,463 A | * | 2/1982 | Weirich ..................... | 137/538 |
| 4,467,767 A | * | 8/1984 | Kampichler et al. ....... | 123/467 |
| 4,628,957 A | * | 12/1986 | Hofer et al. ............. | 137/493.3 |
| 5,715,795 A | * | 2/1998 | Guentert et al. ........... | 123/467 |
| 5,832,954 A | * | 11/1998 | Shafer ................... | 137/543.15 |
| 6,089,262 A | * | 7/2000 | Hart ....................... | 137/543.21 |
| 6,102,010 A | * | 8/2000 | Isozumi et al. ............. | 123/506 |
| 6,209,527 B1 | * | 4/2001 | Bueser et al. .............. | 123/514 |

FOREIGN PATENT DOCUMENTS

JP          2000-45906 A     2/2000

\* cited by examiner

*Primary Examiner*—Carl S. Miller
(74) *Attorney, Agent, or Firm*—Sughrue Mion, PLLC

(57) ABSTRACT

A high pressure fuel supply apparatus is constituted by a plunger reciprocating in a sleeve of a high pressure fuel pump so as to form a fuel pressurizing chamber between the plunger and the sleeve, a suction valve provided in a fuel suction port for sucking fuel into the fuel pressurizing chamber, and a discharge valve provided in a fuel discharge port for discharging fuel from the fuel pressurizing chamber into a high pressure fuel discharge passageway communicating with an internal combustion engine, the discharge valve reciprocating axially so as to perform an open/close operation, wherein the high pressure fuel supply apparatus further comprises a holder for regulating an axial reciprocating movement of the discharge valve in the open/close operation within a predetermined range.

7 Claims, 5 Drawing Sheets

HIGH PRESSURE FUEL SUPPLY APPARATUS

BACKGROUND OF THE INVENTION

The present invention relates to a high pressure fuel supply apparatus chiefly for use in a cylinder fuel injection engine or the like.

FIG. 4 is a block diagram showing a fuel supply system in an internal combustion engine for a vehicle, including a conventional high pressure fuel supply apparatus. In FIG. 4, fuel 2 in a fuel tank 1 is delivered from the fuel tank 1 by a low pressure pump 3, passes through a filter 4, is adjusted in pressure by a low pressure regulator 5, and then is supplied to a high pressure fuel supply apparatus 6 which is a high pressure pump. A flow rate of the fuel 2 exactly required for fuel injection is boosted by the high pressure fuel supply apparatus 6, and supplied into a delivery pipe 9 of the not-shown internal combustion engine. A surplus of the fuel 2 is relieved between a low pressure damper 12 and a suction valve 13 by an electromagnetic valve 17.

In addition, the required fuel flow rate is determined by a not-shown control unit, which also controls the electromagnetic valve 17. The high pressure fuel supplied thus is injected into a cylinder of the internal combustion engine in the form of high pressure mist from a fuel injection valve 10 connected to the delivery pipe 9. When abnormal pressure (high-pressure relieving valve opening pressure power) is produced in the delivery pipe 9, a filter 7 and a high pressure relief valve 8 are opened to prevent the delivery pipe 9 from being broken.

The high pressure fuel supply apparatus 6 which is a high pressure pump has a filter 11 for filtering the supplied fuel, the low pressure damper 12 for absorbing the pulsation of the low pressure fuel, and a high pressure fuel pump 16 for pressurizing the fuel supplied through the suction valve 13 and discharging the high pressure fuel through a discharge valve 14.

FIG. 5 is a sectional view showing a conventional high pressure fuel supply apparatus. In FIG. 5, the high pressure fuel supply apparatus 6 is integrally provided with a casing 61, a high pressure fuel pump 16, an electromagnetic valve 17, and a low pressure damper 12. The high pressure fuel pump 16 is a plunger pump provided in the casing 61.

A fuel pressurizing chamber 163 surrounded by a sleeve 160 and an end of a plunger 161 inserted slidably in the sleeve 160 is formed in the high pressure fuel pump 16. The other end of the plunger 161 abuts against a tappet 164, and the tappet 164 is brought into contact with a cam 100 so as to drive the high pressure fuel pump 16. The cam 100 is provided integrally or coaxially with a cam shaft 101 of the engine so as to reciprocate the plunger 161 along the profile of the cam 100 in cooperation with the rotation of a crank shaft of the engine. The volume of the fuel pressurizing chamber 163 is changed by the reciprocating motion of the plunger 161 so that the fuel boosted to high pressure is discharged from the discharge valve 14.

In the high pressure fuel pump 16, a first plate 162, the suction valve 13, a second plate 166 and a flange portion of the sleeve 160 are held between the casing 61 and an end surface of a spring guide 165, and fastened with a bolt 180. The first plate 162 forms a fuel suction port 162a for sucking fuel from the low pressure damper 12 to the fuel pressurizing chamber 163, and a fuel discharge port 162b for discharging the fuel from the fuel pressurizing chamber 163.

The suction valve 13 shaped into a thin plate is held between the first plate 162 and the second plate 166 so that a valve is formed in the fuel suction port 162a. The discharge valve 14 is provided on an upper portion of the fuel discharge port 162b so as to communicate with the delivery pipe 9 through a high pressure fuel discharge passageway 62 provided in the casing 61. In addition, in order to suck fuel, a spring 167 for pushing the plunger 161 down in a direction to expand the fuel pressurizing chamber 163 is disposed in the state where the spring 167 has been compressed between the spring guide 165 and a spring holder 168.

The electromagnetic valve 17 has an electromagnetic valve body 170, a valve seat 173, a valve 174, and a compression spring 175. The electromagnetic valve body 170 is incorporated in the casing 61 of the high pressure fuel supply apparatus 6 so as to have a fuel channel 172 inside the electromagnetic valve body 170. The valve seat 173 is provided in the fuel channel 172 of the electromagnetic valve body 170. The valve 174 is separated from/brought near to the valve seat 173 in the electromagnetic valve body 170 so as to open/close the fuel channel 172. The compression spring 175 presses the valve 174 onto the valve seat 173.

At a point of time when a flow rate requested from a not-shown control unit has been discharged in a discharge stroke of the high pressure fuel pump 16, a solenoid coil 171 of the electromagnetic valve 17 is excited to open the valve 174. Thus, the fuel 2 in the fuel pressurizing chamber 163 is released to the low pressure side between the low pressure damper 12 and the suction valve 13 so that the pressure in the fuel pressurizing chamber 163 is reduced to be not higher than the pressure in the delivery pipe 9. Thus, the discharge valve 14 is closed. After that, the valve 174 of the electromagnetic valve 17 is opened till the high pressure fuel pump 16 proceeds to a suction stroke. The timing to open the electromagnetic valve 17 is controlled so that the amount of fuel discharged into the delivery pipe 9 can be adjusted.

However, such a conventional high pressure fuel supply apparatus has some problems as follows. FIG. 6 is a sectional view in which the vicinity of a discharge vale is enlarged in scale in a high pressure fuel pump of a conventional high pressure fuel supply apparatus. In FIG. 6, a discharge valve 14 is shaped into a plane plate, having a flat sheet surface to block up a fuel discharge port 162b. The discharge valve 14 is closed by the pressing force of a spring 14a.

However, when the high pressure fuel supply apparatus is driven at a high speed of rotation, there is a problem that the discharge valve 14 is poor in response so that a failure in operation is produced to reduce the discharge quantity of fuel. In addition, there is another problem that the sheet surface is worn due to the partial contact of the discharge valve 14 so that the durability deteriorates.

In such a case, in order to improve the response of the discharge valve 14, measures that the spring constant of the spring 14a is increased to increase the spring load are taken. However, the increase of the spring load results in the increase of loss in pressure of the fuel in the vicinity of the discharge valve 14. Thus, the pressure in the fuel pressurizing chamber 163 so that there occurs a new problem that the durability of the high pressure fuel pump 16 is degraded, and the sheet portion is worn. In addition, even if the discharge valve 14 has a ball-like shape as shown in FIG. 7, a similar problem occurs.

SUMMARY OF THE INVENTION

The present invention is developed to solve such problems. It is an object of the present invention to provide a high pressure fuel supply apparatus which can ensure the fuel discharge quantity in a high speed rotation range and which prevents the sheet surface from being worn.

The high pressure fuel supply apparatus according to the present invention is constituted by a plunger reciprocating in a sleeve of a high pressure fuel pump so as to form a fuel pressurizing chamber between the plunger and the sleeve, a suction valve provided in a fuel suction port for sucking fuel into the fuel pressurizing chamber, and a discharge valve provided in a fuel discharge port for discharging fuel from the fuel pressurizing chamber into a high pressure fuel discharge passageway communicating with an internal combustion engine, the discharge valve reciprocating axially so as to perform an open/close operation, wherein the high pressure fuel supply apparatus further comprises regulating means for regulating an axial reciprocating movement of the discharge valve in the open/close operation within a predetermined range.

DETAILED DESCRIPTION OF THE PREFERRED EMBODIMENTS

Figure 1:
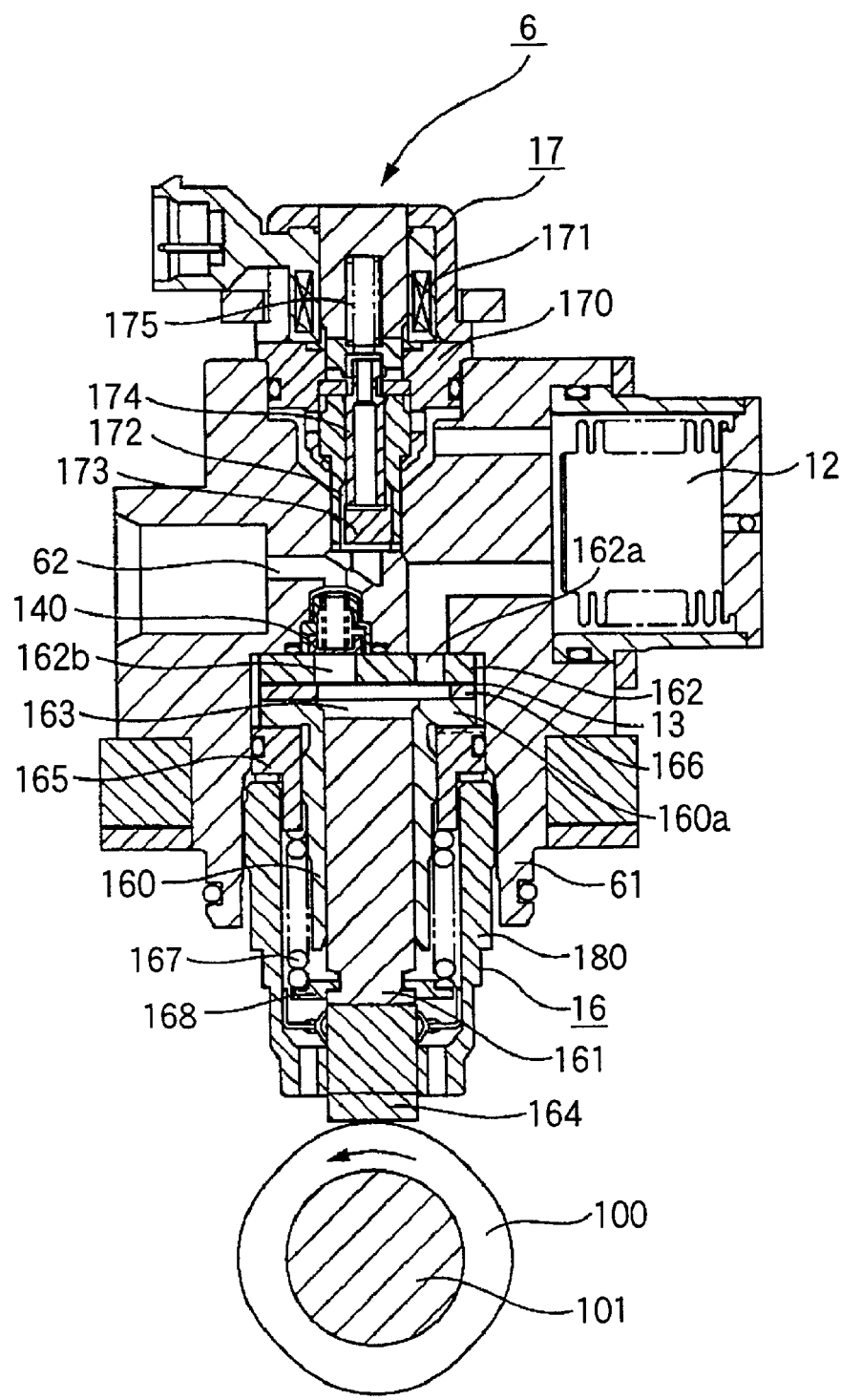
FIG. 1 is a sectional view showing a high pressure fuel supply apparatus according to an embodiment of the present invention.

FIG. 1 is a sectional view showing a high pressure fuel supply apparatus according to an embodiment of the present invention. Incidentally, here, a fuel supply system including this high pressure fuel supply apparatus is basically similar to that in the above-mentioned conventional example, and detailed description thereof will be omitted. In addition, the configuration of an electromagnetic valve 17 is basically similar to that in the conventional example, and detailed description thereof will be omitted. In FIG. 1, a high pressure fuel supply apparatus 6 is integrally provided with a casing 61, a high pressure fuel pump 16, an electromagnetic valve 17 and a low pressure damper 12. The high pressure fuel pump 16 is a plunger pump provided inside the casing 61.

A fuel pressurizing chamber 163 surrounded by a sleeve 160 and an end of a plunger 161 inserted slidably in the sleeve 160 is formed in the high pressure fuel pump 16. A tappet 164 abuts against the other end of the plunger 161. The tappet 164 is brought into contact with a cam 100 so as to drive the high pressure fuel pump 16. The cam 100 is provided integrally or coaxially with a cam shaft 101 of the engine so as to reciprocate the plunger 161 along the profile of the cam 100 in cooperation with the rotation of a crank shaft of the engine. The volume of the fuel pressurizing chamber 163 is changed by the reciprocating motion of the plunger 161 so that the fuel boosted to high pressure is discharged from a discharge valve 140.

In the high pressure fuel pump 16, a first plate 162, a suction valve 13, a second plate 166 and a flange portion 160a of the sleeve 160 are held between the casing 61 and an end surface of a spring guide 165, and fastened with a not-shown bolt. In the first plate 162, two through holes are formed, that is, a fuel suction port 162a for sucking fuel from the low pressure damper 12 to the fuel pressurizing chamber 163, and a fuel discharge port 162b for discharging the fuel from the fuel pressurizing chamber 163 are formed.

The suction valve 13 shaped into a thin plate is held between the first plate 162 and the second plate 166 so that a valve is formed in the fuel suction port 162a. The discharge valve 140 is provided on an upper portion of the fuel discharge port 162b so as to communicate with a delivery pipe 9 through a high pressure fuel discharge passageway 62 provided in the casing 61. In addition, in order to suck fuel, a spring 167 for pushing the plunger 161 down in a direction to expand the fuel pressurizing chamber 163 is disposed in the state where the spring 167 has been compressed between the spring guide 165 and a spring holder 168.

Figure 2:
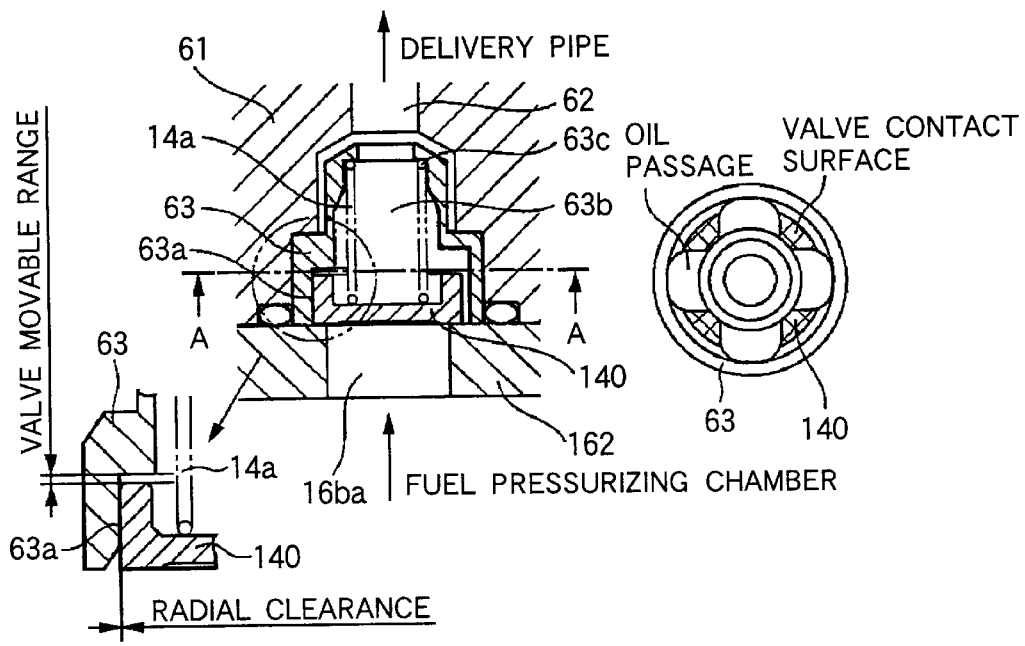
FIG. 2 is a sectional view in which the vicinity of a discharge valve is enlarged in scale in a high pressure fuel pump of a high pressure fuel supply apparatus according to an embodiment of the present invention.

FIG. 2 includes a sectional view and sectional views taken on line A—A thereof, in which the vicinity of a discharge valve is enlarged in scale in a high pressure fuel pump of a high pressure fuel supply apparatus according to an embodiment of the present invention. In FIG. 2, a discharge valve 140 has a cup-like shape having a recess portion bottom surface to block up a fuel discharge port 162b. The discharge valve 140 is closed by the pressing force of a spring 14a. In addition, a holder 63 is fitted into a high pressure fuel discharge passageway 62 above the fuel discharge port 162b. The holder 63 has a movement regulating portion 63a for regulating the discharge valve 140 so that the discharge valve 140 can move axially within a predetermined range in an open/close operation of the discharge valve 140. Thus, by use of the movement regulating portion 63a, the holder 63 constitutes regulating means. In addition, inside the holder 63, a fuel channel 63b is formed in the direction in which the discharge valve 140 can move, and a spring bearing surface 63c with which the spring 14a is brought into contact is formed.

With such a configuration, the behavior of the discharge valve 140 can be regulated by the holder 63 without increasing the spring load of the spring 14a for the discharge valve as in the above-mentioned conventional example. Thus, a stable discharge quantity of fuel can be ensured even in a high speed rotation range. It is therefore possible to prevent the fuel pressurizing chamber 163 from increasing in pressure due to the increase of loss in pressure caused by the increase of the spring load. Thus, it is possible to improve the durability of the high pressure fuel supply apparatus.

In addition, in order to prevent the discharge valve 140 from tilting due to the fuel pressure, it is desired that a side surface of the discharge valve 140 is opposed to the inner wall of the holder 63 over a long distance. However, in order to make such a configuration, it is necessary to thicken the discharge valve 140. If the discharge valve to be thickened is formed of a flat plate simply, the weight thereof increases. Therefore, according to this embodiment, the discharge valve 140 is formed into a cup having a recess portion bottom surface to block up the discharge port. As a result, the weight can be reduced correspondingly to the hollow portion in the cup, in comparison with that when the discharge valve is formed of a flat plate simply.

In addition, when the holder 63 which is a member separate from a casing 61 of the high pressure fuel supply apparatus is used as regulating means, the setting of the movable range of the discharge valve 140, the setting of the radial clearance with the discharge valve 140, further the material of the holder 63, and so on, can be changed easily simply by exchanging the holder 63. Thus, the properties of the high pressure fuel supply apparatus can be set desirably. For example, the flow rate of fuel required at a high speed rotation range can be adjusted by changing the depth of the movement regulating portion 63a in the holder 63. In addition, the wear of the discharge valve 140 caused by partial contact when the discharge valve 140 is closed can be prevented by adjusting the radial clearance with the discharge valve 140. It is desired that this radial clearance is set to be in a range of from 0.05 mm to 0.1 mm in diameter in this embodiment.

In addition, inside the holder 63, the fuel channel 63b is formed in the direction in which the discharge valve 140 can move, so that the fuel channel 63b communicates directly with the high pressure fuel discharge passageway 62. Accordingly, the fuel channel arrangement inside the casing 61 can be simplified so that the apparatus can be miniaturized. Further, the spring bearing surface 63c with which the spring 14a is brought into contact is formed inside the holder 63. Accordingly, when the spring load or the like is intended to be changed, such a change can be made easily simply by the exchange of the holder 63. Thus, the properties of the high pressure fuel supply apparatus can be set desirably.

Figure 3:
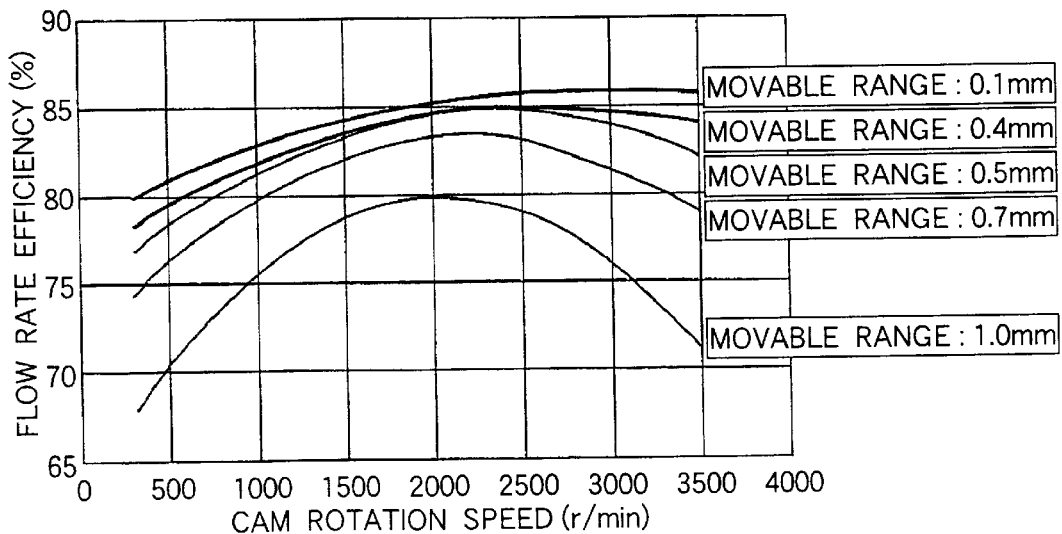
FIG. 3 is a graph showing the relationship between the cam rotation speed and the flow rate efficiency in the high pressure fuel pump of the high pressure fuel supply apparatus according to the embodiment of the present invention.
Figure 4:
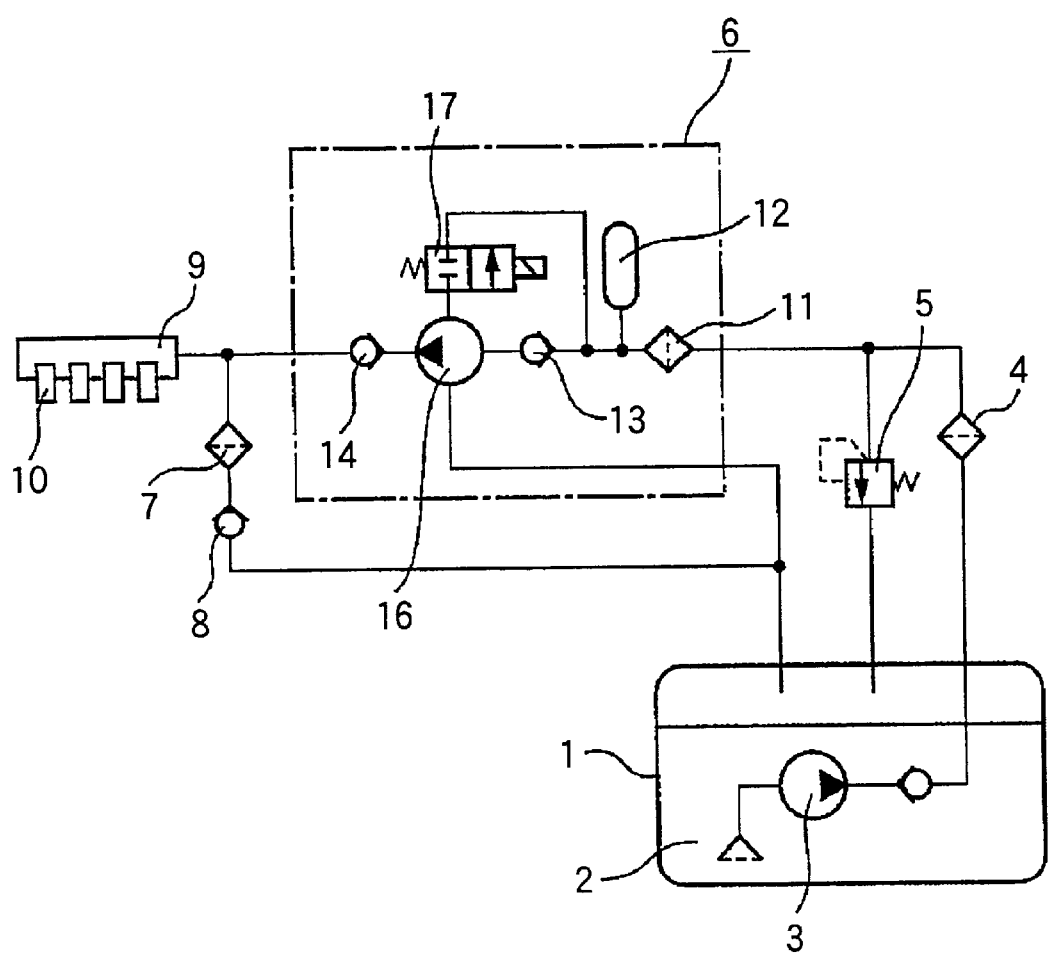
FIG. 4 is a block diagram showing a fuel supply system in an internal combustion engine for a vehicle, including a conventional high pressure fuel supply apparatus.
Figure 5:
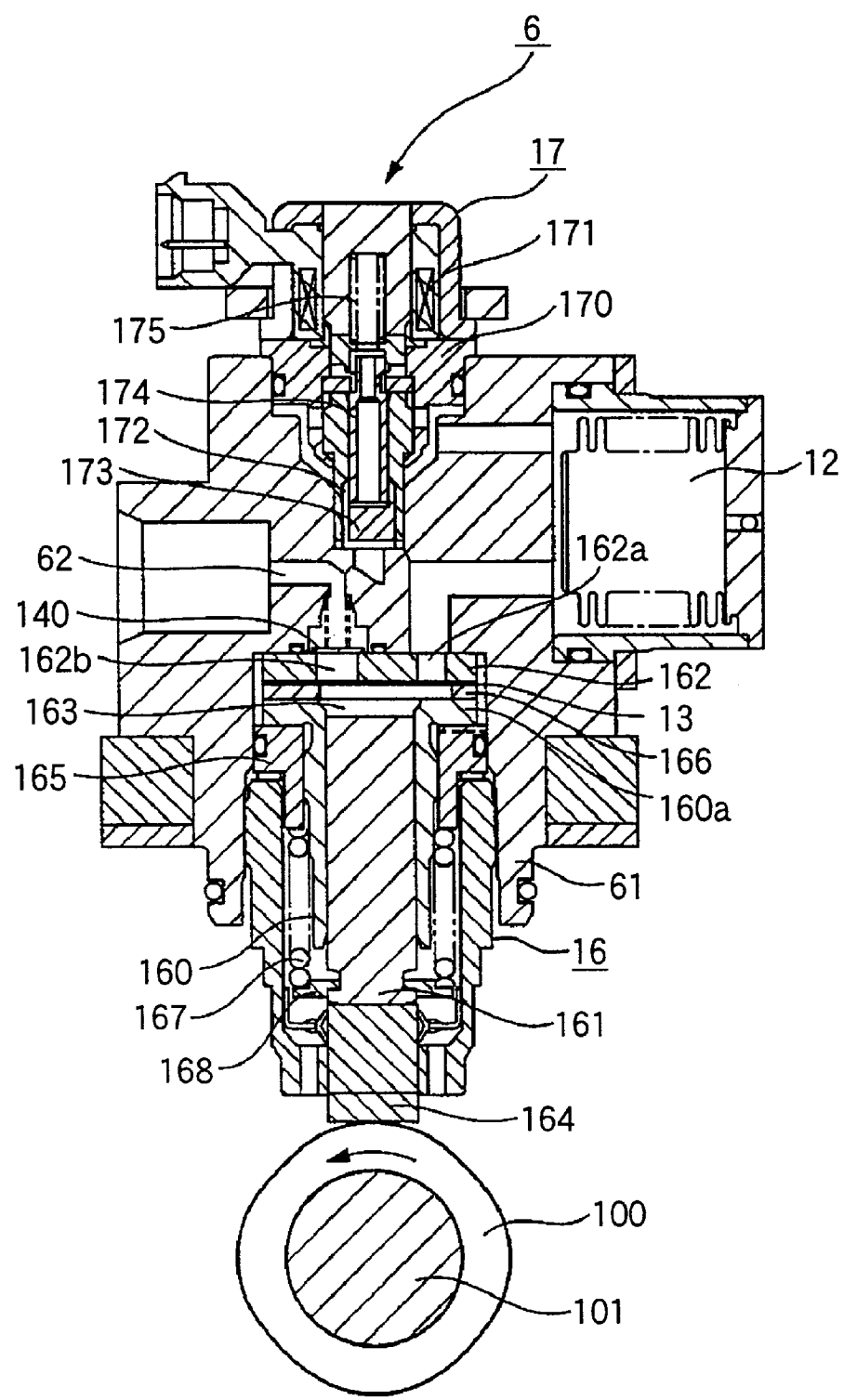
FIG. 5 is a sectional view showing a conventional high pressure fuel supply apparatus.
Figure 6:
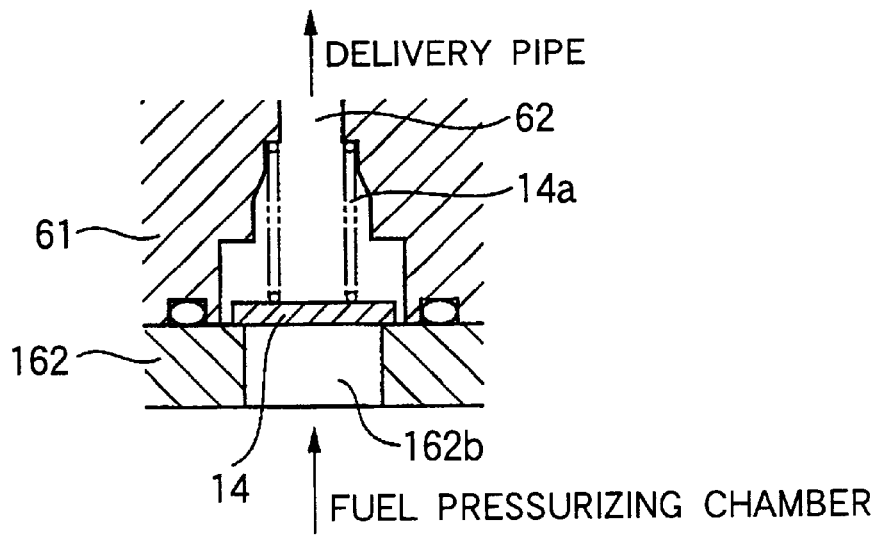
FIG. 6 is a sectional view in which the vicinity of a discharge vale is enlarged in scale in a high pressure fuel pump of a conventional high pressure fuel supply apparatus.
Figure 7:
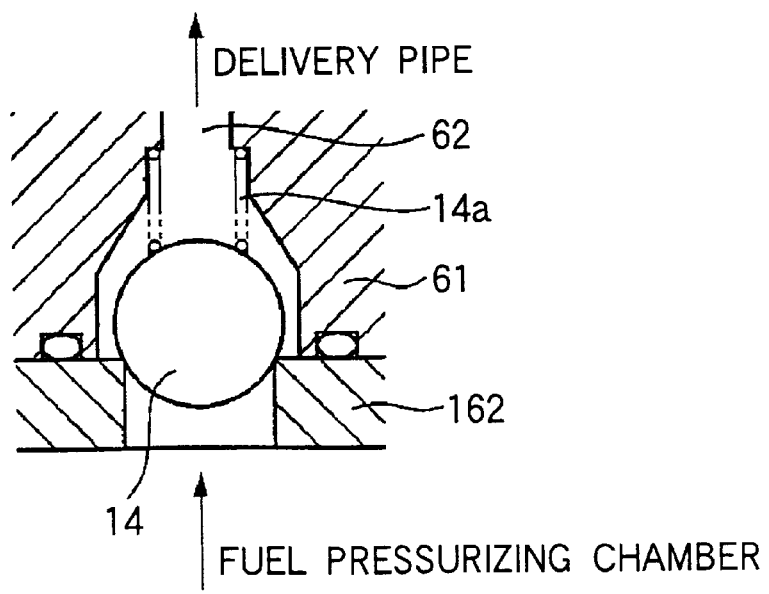
FIG. 7 is a sectional view in which the vicinity of a discharge vale is enlarged in scale in a high pressure fuel pump of a conventional high pressure fuel supply apparatus.

FIG. 3 is a graph showing the relationship between the cam rotation speed and the flow rate efficiency in the high pressure fuel pump of the high pressure fuel supply apparatus according to this embodiment of the present invention. In FIG. 3, the ordinate of the graph designates the flow rate efficiency (real flow rate/theoretical discharge flow rate× 100%, the theoretical discharge rate is herein diameter of a sleeve 160×lifting capacity of the discharge valve 14), and the abscissa designates the rotation speed (r/min) of a cam 100. In addition, the solid lines in the graph designate properties respectively when the axial movable range of the discharge valve 140 is set to be in a range of from 0.1 mm to 1.0 mm.

As shown in FIG. 3, it is understood that the flow rate efficiency is excellent in the movable range of from 0.1 mm to 0.4 mm, and conspicuous particularly in a high rotation speed range. Accordingly, if the movement regulating portion 63a of the holder 63 in this embodiment is formed so that the lifting capacity of the discharge valve 140 is in a range of from 0.1 mm to 0.4 mm, a stable discharge quantity can be ensured even in a high rotation speed range.

Incidentally, in the above-mentioned embodiment, description was made about an example in which the holder 63 was used as regulating means for regulating the axial movement of the discharge valve 140 in the open/close operation of the discharge valve 140. The regulating means is not limited to such arrangement, but any other arrangement may be adopted if it can obtain a desired effect.

As described above, according to the present invention as stated in Aspect 1, there is provided a high pressure fuel supply apparatus constituted by a plunger reciprocating in a sleeve of a high pressure fuel pump so as to form a fuel pressurizing chamber between the plunger and the sleeve, a suction valve provided in a suction port for sucking fuel into the fuel pressurizing chamber, and a discharge valve provided in a discharge port for discharging fuel from the fuel pressurizing chamber into a high pressure fuel discharge passageway communicating with an internal combustion engine, the discharge valve reciprocating axially so as to perform an open/close operation, wherein the high pressure fuel supply apparatus further comprises regulating means for regulating an axial reciprocating movement of the discharge valve in the open/close operation within a predetermined range. Accordingly, the behavior of the discharge valve can be regulated by the holder without increasing the spring load on the discharge valve. Thus, a stable discharge quantity of fuel can be ensured even in a high speed rotation range. In addition, it is possible to prevent the fuel pressurizing chamber from increasing in pressure due to the increase of loss in pressure caused by the increase of the spring load. At the same time, it is possible to prevent the sheet surface from being worn, so that it is possible to obtain an effect that the durability of the high pressure fuel supply apparatus can be improved.

Further, according to the present invention as stated in Aspect 2, the regulating means is a holder which is fitted into the high pressure fuel discharge passageway above the discharge port and which forms a space so that the discharge valve can move axially within the predetermined range. Accordingly, the setting of the movable range of the discharge valve, the setting of the radial clearance with the discharge valve, further the material of the holder, and so on, can be changed easily simply by exchanging the holder. Thus, it is possible to obtain an effect that the properties of the high pressure fuel supply apparatus can be set desirably.

Further, according to the present invention as stated in Aspect 3, a fuel channel is formed inside the holder in a direction in which the discharge valve can move. Accordingly, the fuel channel arrangement inside the casing of the high pressure fuel supply apparatus can be simplified. Thus, it is possible to obtain an effect that the apparatus can be miniaturized.

Further, according to the present invention as stated in Aspect 4, a spring bearing surface is provided inside the holder, the spring bearing surface being brought into contact with a spring for pressing the discharge valve in a direction to close the discharge valve. Accordingly, the spring load or the like is to be changed, such a change can be made easily simply by the exchange of the holder. Thus, it is possible to obtain an effect that the properties of the high pressure fuel supply apparatus can be set desirably.

Further, according to the present invention as stated in Aspect 5, the discharge valve is shaped into a cup having a recess portion bottom surface to block up the discharge port. Accordingly, it is possible to obtain an effect that the weight can be reduced.

Further, according to the present invention as stated in Aspect 6, the axially movable range of the discharge valve in the open/close operation is from 0.1 mm to 0.4 mm. Accordingly, it is possible to obtain an effect that a stable discharge quantity of fuel can be ensured particularly in a high rotation speed range.

What is claimed is:

1. A high pressure fuel supply apparatus comprising:
   a plunger reciprocating in a sleeve of a high pressure fuel pump so as to form a fuel pressurizing chamber between said plunger and said sleeve,
   a suction valve provided in a fuel suction port for sucking fuel into said fuel pressurizing chamber, a discharge valve provided in a fuel discharge port for discharging fuel from said fuel pressurizing chamber into a high pressure fuel discharge passageway communicating with an internal combustion engine, said discharge valve reciprocating axially so as to perform an open/close operation, and regulating means for regulating an axial reciprocating movement of said discharge valve in said open/close operation within a predetermined range;

wherein said axially movable range of said discharge valve in said open/close operation is from 0.1 mm to 0.4 mm.

2. The high pressure fuel supply apparatus according to claim 1, wherein a radial clearance between a discharge valve and a holder is set to be in a range of from 0.05 mm to 0.1 mm in diameter.

3. The high pressure fuel supply apparatus according to claim 1, wherein said regulating means is a holder which is fitted into said high pressure fuel discharge passageway above said fuel discharge port and in which a movement regulating portion is formed so that said discharge valve is capable to move axially within the predetermined range.

4. The high pressure fuel supply apparatus according to claim 3, wherein a fuel channel is formed inside said holder in a direction in which said discharge valve is capable to move.

5. The high pressure fuel supply apparatus according to claim 3, wherein a spring bearing surface is provided inside said holder, said spring bearing surface being brought into contact with a spring for pressing said discharge valve in a direction to close said discharge valve.

6. The high pressure fuel supply apparatus according to claim 1, wherein said discharge valve is shaped into a cup having a recess portion bottom surface to block up said fuel discharge port.

7. The high pressure fuel supply apparatus according to claim 3, wherein the holder is removable.

* * * * *